United States Patent [19]

Schertler

[11] Patent Number: 4,520,993

[45] Date of Patent: Jun. 4, 1985

[54] METERING VALVE

[76] Inventor: Siegfried Schertler, In der Au 6, CH9469 Haag, Switzerland

[21] Appl. No.: 565,615

[22] Filed: Dec. 27, 1983

[30] Foreign Application Priority Data

Dec. 27, 1982 [DE] Fed. Rep. of Germany ....... 3248150

[51] Int. Cl.³ ............................................. F16K 31/12
[52] U.S. Cl. ........................................ 251/57; 251/5; 251/61.1; 251/334
[58] Field of Search .................... 251/4, 5, 8, 61.1, 62, 251/57, 334; 60/594; 91/460

[56] References Cited

U.S. PATENT DOCUMENTS

| | | | |
|---|---|---|---|
| 1,120,717 | 12/1914 | Hogan | 60/594 |
| 3,039,733 | 6/1962 | Mattioli | 251/57 |
| 3,626,497 | 12/1971 | Lambert et al. | 251/8 |
| 3,753,548 | 8/1973 | Jung et al. | 251/305 |
| 3,840,207 | 10/1974 | Carpenter, Jr. | 251/5 |
| 4,023,772 | 5/1977 | Ratelband | 251/5 |
| 4,241,583 | 12/1980 | Farr | 60/594 |
| 4,271,862 | 6/1981 | Snoek | 251/363 |
| 4,310,140 | 1/1982 | Boomer et al. | 251/5 |
| 4,395,016 | 7/1983 | Welker | 251/5 |

Primary Examiner—Martin P. Schwadron
Assistant Examiner—Sheri Novack
Attorney, Agent, or Firm—Toren, McGeady, Stanger

[57] ABSTRACT

An all metal gas metering valve is used in high vacuum installations in the range of $10^{-9}$ Torr. 1/sec. to 100 Torr. 1/sec. relative to helium and 20° C. ambient temperature. An axially extending tubular member forming a part of the valve housing contains a rotationally symmetrical valve body. A bushing laterally encloses at least an axially extending part of and is welded to the tubular member around two welded seams spaced apart in the axial direction of the tubular member. A pressurized medium can be charged into the joint between the inside surface of the bushing and the outside surface of the tubular member and limited by the welded seams. The pressure acting on the tubular member constricts its cross-section and reduces the space between the side surface of the tubular member and the valve body. Initially, the space between the valve body and the tubular member can be kept very small so that a wide adjustment range is available by varying the pressure acting on the tubular member.

14 Claims, 4 Drawing Figures

METERING VALVE

SUMMARY OF THE INVENTION

The present invention is directed to a metering valve including a valve housing with a rotationally symmetrical valve body positioned in the valve housing. In its active metering position, the valve body is located in an elastically deformable tube member forming part of the valve housing. In this active metering position, the tube member is laterally enclosed within a cylindrical bushing and the bushing is secured in a sealed manner with the outside surface of the tubular member. The bushing contains a bore filled with a pressure-transmitting medium and a portion of the bore opens through the inside surface of the bushing in contact with the outside surface of the tubular member.

A hose-type shutoff valve is disclosed in the German Offenlegungsschrift No. 25 11 306 and it includes a torpedo-shaped insert located within a cylindrical, rubber-elastic hose and the ends of the hose are clamped within a cylindrical housing. This hose-type shutoff valve is closed when compressed air is admitted into the housing around the hose so that the hose moves radially inwardly against the insert closing off the passage between the hose and the insert. Such hose-type shutoff valves have proved to be successful in systems where there is a low pressure liquid flow. They are not suitable, however, for high vacuum installations and particularly not for valves used for metering very low pressure gas.

Metering valves for very low pressure gas have been designed as needle valves, however, the field of application of such valves is limited. The requirements for metering valves in high vacuum installations require a broad adjustment range. Such adjustment range should be from $10^{-9}$ Torr. l/sec. to 100 Torr. l/sec. relative to helium and 20° C. ambient temperature.

Therefore, it is the primary object of the invention to provide a metering valve which is effective over such a wide range. Rather than utilizing the known needle valves for metering purposes, the present invention employs the valve principle mentioned above.

In accordance with the present invention, a metering valve for high vacuum uses is constructed as an all metal design with the bushing being of a significantly greater thickness than the tubular member so that it is not elastically deformable. The bore in the bushing is variable and is filled with an incompressible medium.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the Drawing:

FIG. 3 is a sectional view of a metering valve similar to FIG. 1 illustrating another embodiment of the present invention; and FIG. 4 is a sectional view similar to FIGS. 1 and 3 illustrating still another embodiment of the invention.

DETAILED DESCRIPTION OF THE INVENTION

Figure 1:
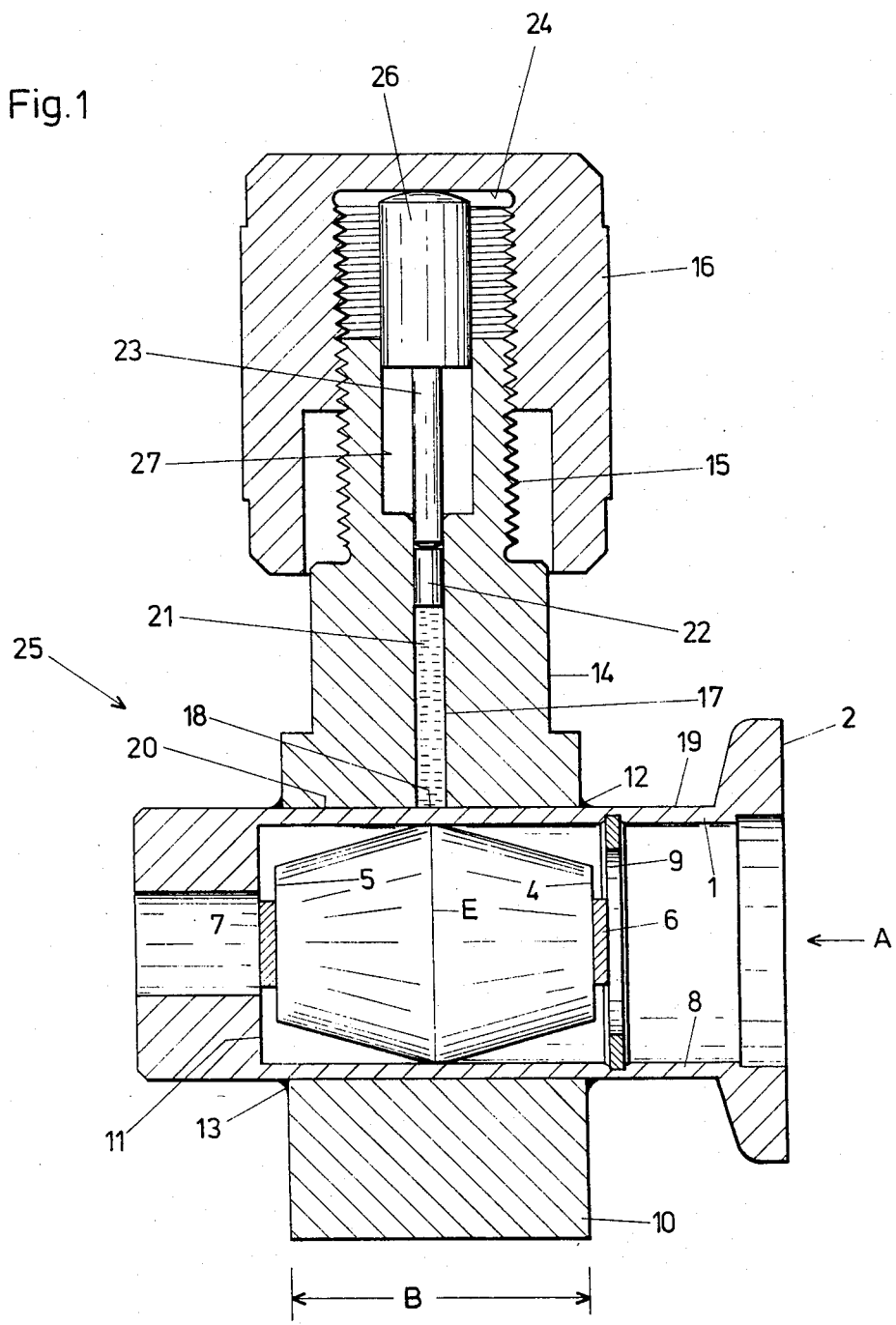
FIG. 1 is a sectional view of a metering valve embodying the present invention.
Figure 2:
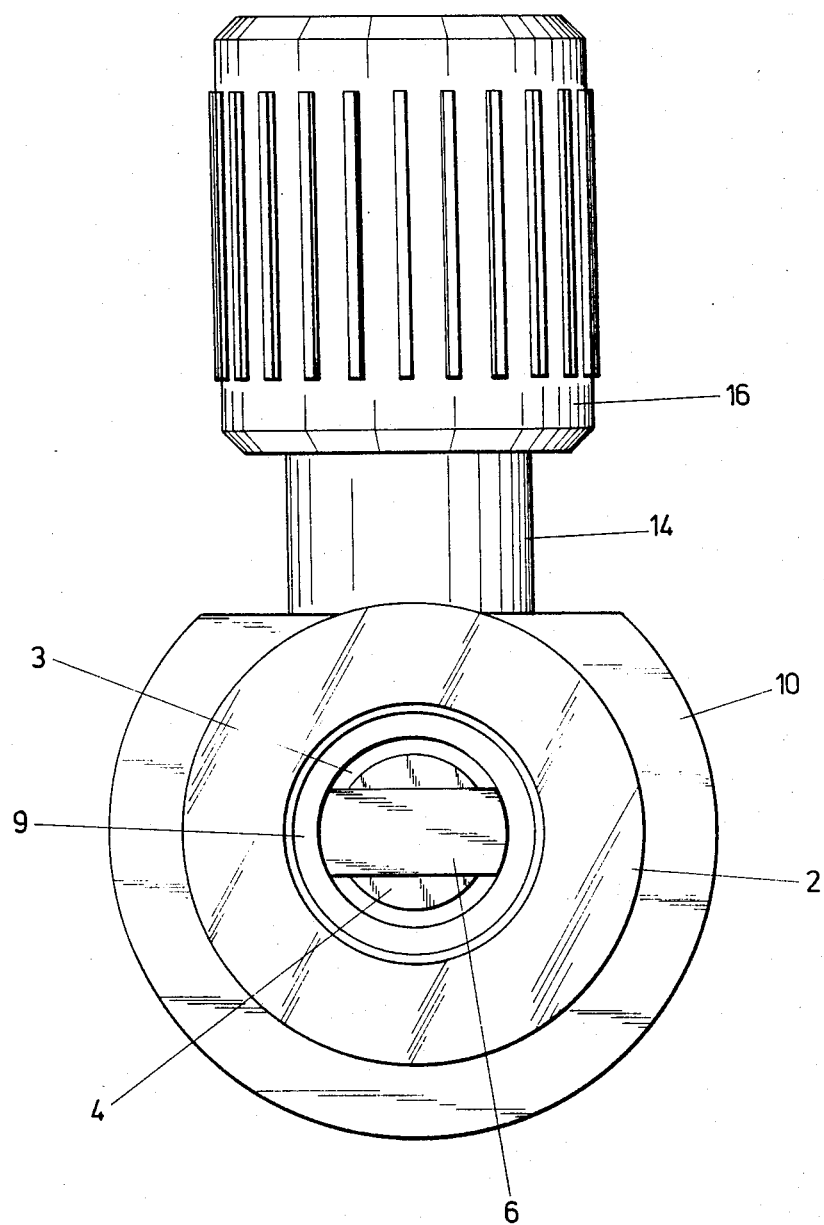
FIG. 2 is an elevational view of the metering valve viewed in the direction of the arrow A in FIG. 1.

One embodiment of the invention is illustrated in FIGS. 1 and 2, however, the invention is not limited to this one embodiment.

In FIGS. 1 and 2 an all metal gas metering valve is illustrated and includes a valve housing 25 including an axially extending tubular member 1 with ends arranged for connection to a pipeline or a tank, not shown. As shown in FIG. 1, the right-hand end of the tubular member 1 is provided with a flange 2. A rotationally symmetrical valve body 3 is positioned in the tubular member and is formed of a pair of axially extending frusto-conical sections with the largest diameter end of each frusto-conical section located at the midplane of the valve body. The axis of the valve body is parallel to and coaxial with the axis of the tubular member 1. The diameter of the largest transverse cross-sectional plane E of the valve body corresponds approximately to the inside diameter of the tubular member 1 so that the valve body can be inserted into position through the tubular member. To secure the valve body against axial displacement, the smaller diameter end faces 4, 5 of each of the frusto-conical sections support transversely extending webs 6, 7 and the webs bear against limiting surfaces within the tubular member 1. One limiting surface is formed by a snap ring 9 inserted into a groove in the inside surface of the tubular member and the other limiting surface is provided by a reduced inside diameter section of the tube 1, note the left-hand side of FIG. 1. In this embodiment, as can be seen in FIGS. 1 and 2, the valve body 3 remains in the axially extending region of the tubular member between the snap ring 9 and the shoulder 11 formed by the reduced diameter section of the tubular member.

The tubular member 1 is located within a sleeve-like, thickwalled, basically cylindrically-shaped bushing 10. The inside surface of the bushing 10 is in closely fitting contact with the outside surface of the tubular member 1. While the tubular member 1 is elastically deformable in the region containing the valve body 3, the bushing 10 is rigid and is not elastically deformable. Bushing 10 has an extension 14 extending radially outwardly relative to the tubular member 1 and the radially outer end of the extension is threaded on its outside surface. A manually operable, rotatable handle 16 is in threaded engagement, within an interior bore, with the extension 14. Extension 14 has a bore 17 extending through the entire radial dimension of the bushing 10 and the extension 14, that is, the bore extends from the radially outer end of the extension 14 to the inner surface 20 of the bushing 10. At the inner end of the bore 17 an opening 18 is in contact with the outside surface 19 of the tubular member 1. The bore 17 is filled with an incompressible medium, such as paraffin or hydraulic oil. A piston 22 is located in the bore 17 spaced outwardly from the tubular member 1 and it rests on the surface of the incompressible medium. The radially outer end of the piston 22 is in contact with a plunger 23 which is formed of a smaller diameter section and a larger diameter section with the smaller diameter section located in the bore 17 in contact with the piston and the larger diameter section located at the radially outer end of the plunger. The larger diameter section 26 of the plunger 23 extends out of the radially outer end of the extension 14 into the pilot hole bore 24 in the handle 16.

The above description sets forth the basic arrangements of the all metal gas metering valve shown in FIGS. 1 and 2. When the valve is in the open position, the handle 16 is threaded onto the extension 14 so that the medium 21 in the borehole 17 is practically under no pressure. The aperture or opening of the metering valve is provided by the clearance between the inside diameter of the tubular member 1 and the largest outside diameter cross-section of the plane E of the valve body 3 and this clearance can be kept to a very small opening. To reduce the aperture or opening, the rotatable handle 16 is threaded onto the extension 14 so that it moves inwardly toward the tubular member, that is, moves downwardly as viewed in FIG. 1. As the rotatable handle 16 moves downwardly, it presses the plunger against the piston 22 which, in turn, presses downwardly against the medium 21 in the bore 17. The pressure developed in the medium 21 causes it to flow into the joint formed between the inside surface 20 of the bushing 10 and the outside surface 19 of the tubular member 1 located between the welding seams 12, 13 which provide a sealing action for the joint. The pressure developed in the joint acting on the outside surface 19 of the tubular member 1 constricts its cross-sectional area in the region encircled by the bushing 10 so that the valve aperture or opening is gradually reduced. Because of its thickwalled design, the bushing absorbs the increase in pressure without any particular deformation in contrast to the tubular member 1 which is elastically deformable. The tubular member 1 is deformed exclusively in the elastic region of its material. If the rotatable handle 16 is backed off or threaded relative to the extension 14, a pressure reduction takes place with the medium 21 being returned from the joint between the bushing and the tubular member into the bore 17 due to the elastic return force of the tube 1.

By the appropriate design the thread 15 with respect to length and diameter and by the selected profile of the bore 17, pressure transmission ratios can be controlled over a wide range.

In the illustrated embodiment, the valve body 3 is shown in the form of a double frusto-conical section with the largest cross-sectional area plane E forming the sealing edge interacting with the inside surface of the tubular member 1 during its elastic deformation or constriction. In place of the double frusto-conical section a ball, or spherical member 3' can be used, note FIG. 3. Further, it is also possible to use a disk or a flap-like valve body 3" which, in addition, may be pivoted, note FIG. 4. In such an arrangement, the pivot pins must have a certain lengthwise clearance so that the wall of the tubular member can move freely when the metering valve is actuated as described above. When such a valve is used as a metering valve, the preferred plane of the disk-like or flap-like valve body is located at right angles to the longitudinal axis of the tube. This position is characterized as the active position. Valve bodies of the kind just described may also be mounted so that they can be extended into and retracted from the active position by movement in the longitudinal direction of the tubular member 1, possibly aided by a lateral pivoting motion as known in slide valve designs.

In place of a manually operated rotatable handle 16, it is possible to use a power-driven control member. In such an arrangement, the handle 16 would be provided with teeth interacting with a power-driven pinion. Other actuators which perform an axial or a pivoting movement, such as piston-cylinder actuators or lever actuators, could also be employed.

In the embodiment illustrated, the bore 17 whose volume is variable, extends radially relative to the tubular member 1. Since the pressure in such a medium acts uniformly in all directions, the bore can be arranged in another direction such as an angular design so that one section of this angular bore runs parallel to the axis of tubular member 1. Such an arrangement may be significant in instances where, for reasons of limited space, the bore cannot extend radially as shown in FIGS. 1 and 2.

While specific embodiments of the invention have been shown and described in detail to illustrate the application of the inventive principles, it will be understood that the invention may be embodied otherwise without departing from such principles.

I claim:

1. Metering valve for use in high vacuum installations comprising a valve housing, a valve body located within said valve housing, said valve body is rotationally symmetrical about a first axis, said valve housing including an axially extending elastically deformable tubular member having an outside surface and an inside surface with the axis of said tubular member being coaxial with the first axis of said valve body, said valve body having an active metering position and in the active metering position said valve body is located in said tubular member, a sleeve member laterally enclosing said tubular member at least in the axially extending region containing the active metering position of said valve body, said sleeve member is tightly sealed to said tubular member, at spaced locations in the axial direction of said tubular member, said sleeve member has an inside surface in closely fitting relation with the outside surface of said tubular member so that a joint is formed therebetween, said sleeve member has a bore therein with one end of the bore located at said inside surface of said sleeve member so that the one end of said bore opens to the outside surface of said tubular member and to the joint between said inside surface of said sleeve member and said outside surface of said tubular member, said metering valve is an all metal design with said tubular member and sleeve member each being formed of metal, said sleeve member is of a significantly greater wall thickness than said tubular member, and said bore in said sleeve is arranged to contain a fluid medium so that under pressure said fluid medium in contact with the outside surface of said tubular member flows into the joint between said sleeve member and tubular member and elastically deforms said tubular member without deforming said sleeve member due to the wall thickness differences between said sleeve member and tubular member and effects an inward movement of said tubular member relative to said valve body for at least partially closing the metering valve.

2. Metering valve, as set forth in claim 1, wherein said rotationally symmetrical valve body is in the form of a double frusto-conical section with each frusto-conical section tapering outwardly from an opposite end to a maximum diameter cross-sectional plane located between the ends, with the maximum diameter cross-sectional plane corresponding approximately to the inside diameter of said tubular member so that said valve body can be inserted into said valve body.

3. Metering valve, as set forth in claim 1, wherein said rotationally symmetrical valve body is in the form of a spherical member.

4. Metering valve, as set forth in claim 1, wherein said rotationally symmetrical valve body is in the form of a flap pivotally mounted in said tubular member.

5. Metering valve, as set forth in claim 1, wherein said sleeve member comprises a thickwalled bushing, the opposite ends of said thickwalled bushing being welded to the outside surface of said tubular member about a pair of circumferentially extending welding seams so that the space froming the joint between the inside surface of said bushing and the outside surface of said tubular member is sealed, and the end of said bore which opens to the outside surface of said tubular member is centered between said welding seams.

6. Metering valve, as set forth in claim 5, wherein the spacing between said welding seams is at least approximately as great as the diameter of said tubular member.

7. Metering valve, as set forth in claim 2, wherein said double frusto-conical section valve body has a web at each of the opposite ends thereof extending perpendicularly of the axis of said tubular member, said tubular member has cross-sectional constrictions within the inside surface thereof so that said webs bear against said constrictions preventing axial movement of said valve body.

8. Metering valve, as set forth in claim 3, wherein said spherical member valve body has a web at each of the opposite ends thereof extending perpendicularly of the axis of said tubular member and said tubular member has cross-sectional constrictions within the inside surface thereof so that said webs bear against said constrictions preventing axial movement of said valve body.

9. Metering valve, as set forth in claim 7, wherein one of said cross-sectional constrictions comprises a snap ring inserted into and extending radially inwardly from the inside surface of said tubular member.

10. Metering valve, as set forth in claim 8, wherein one of said cross-sectional constrictions comprises a snap ring inserted into and extending radially inwardly from the inside surface of said tubular member.

11. Metering valve, as set forth in claim 1, wherein said sleeve member comprises a thickwalled bushing encircling said tubular member and said bushing includes an extension extending radially outwardly from said bushing, said bore extends radially through said bushing and said extension, a radially extending part of said extension from the radially outer end thereof is threaded, a rotatable handle is disposed in threaded engagement with said extension, a piston located within said bore, and said piston is in contact with said rotatable handle so that said piston can be pressed inwardly against the medium in said bore for pressurizing said medium.

12. Metering valve, as set forth in claim 11, wherein said extension extends radially relative to said tubular member and said bore extends in the radial direction from said tubular member through said bushing and said extension to the radially outer end of said extension.

13. Metering valve, as set forth in claim 11, wherein said thread on said extension is an external thread, said handle is a manually operable rotatable handle, a plunger disposed in contact with said handle and extending into said bore into contact with said piston.

14. Metering valve, as set forth in claim 13, wherein said plunger has a first smaller diameter section and a second larger diameter section with said first section extending into said bore into contact with said piston and said second section extending into said handle.

* * * * *